FREQUENCY DIVISION MULTIPLEX RECORDER

Filed March 18, 1964 2 Sheets-Sheet 1

INVENTOR:
Dennis Gabor
By Smyth, Roston & Pavitt
Attorneys

FREQUENCY DIVISION MULTIPLEX RECORDER
Filed March 18, 1964 2 Sheets-Sheet 2
Fig. 3
| →Time | 1 | 2 | 3 | 4 | 5 | 6 |
|---|---|---|---|---|---|---|
| Channel | +1 | +1 | +1 | +1 | +1 | +1 |
| | +1 | +1 | -1 | -1 | +1 | +1 |
| | +1 | -1 | -1 | +1 | +1 | -1 |
| | +1 | -1 | +1 | -1 | +1 | -1 |
Fig. 4a
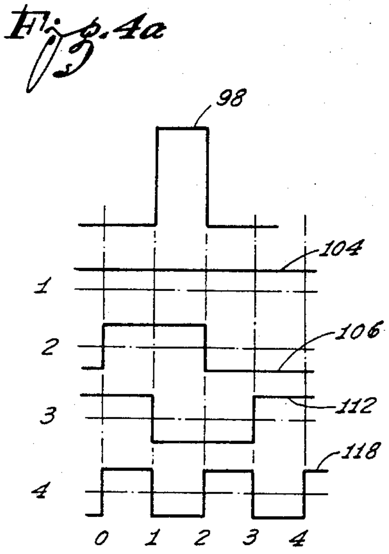
Fig. 4b
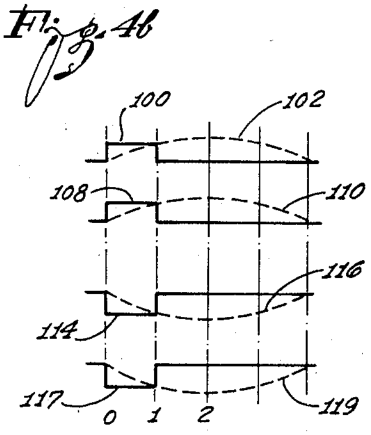
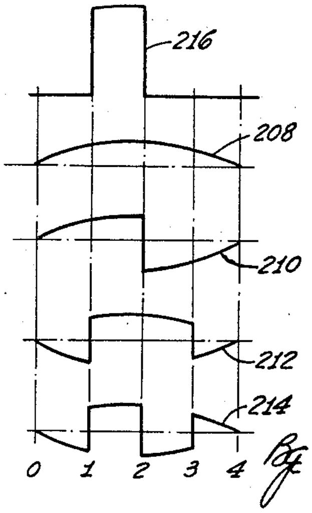
Fig. 4c
INVENTOR:
Dennis Gabor
By Smyth, Roston & Pavitt
Attorneys United States Patent Office 3,412,214
Patented Nov. 19, 1968

3,412,214
FREQUENCY DIVISION MULTIPLEX RECORDER
Dennis Gabor, London, England, assignor to Minnesota Mining and Manufacturing Company, St. Paul, Minn., a corporation of Delaware
Filed Mar. 18, 1964, Ser. No. 352,770
24 Claims. (Cl. 179—100.2)

ABSTRACT OF THE DISCLOSURE

A system for converting a wide band signal into a plurality of signals of narrower bandwidth. The narrower bandwidth signals are produced by modulating the side band signal with square waves of selected frequencies and phase displacements and then passing the modulated signals thru low pass filters. The narrower bandwidth signals may be recorded in separate recording tracks, and subsequently detected, and modulated by square waves of selected frequencies and phase displacements similar to those used in the division process, and combined to reproduce the original wide band signal.

The present invention relates to means for processing signals that cover a wide band of frequencies and, more particularly, to means for recording such signals.

In some types of electrical equipment, it is necessary to employ signals that occupy an extended or wide band of frequencies. In some forms of data processing equipment and computers, the data signals often cover a bandwidth that extends from about zero cycles to an upper limit on the order of at least 2 megacycles. In the present day television systems, the video signals normally are in a bandwidth that extends from about zero cycles to an upper limit in the region of about 5 or 6 megacycles. Many forms of electrical equipment can be designed and built that are capable of operating over such bandwidths. However, certain types of equipment such as transmission lines as well as recording and reproducing equipment inherently have a limited band of frequencies within which they naturally operate effectively. As a consequence, when such equipment is modified or improved to operate over an increased bandwidth, it becomes very complex, expensive and difficult to use.

At the present time, the most satisfactory means of recording electrical signals is the so-called magnetic tape recorder. In such a recorder, a tape having a film of magnetic material thereon is moved past an air gap in a magnetic head whereby portions of the film will be magnetized by the signal. Although this is a very satisfactory means of recording signals, in order to record high frequency signals having several megacycles per second, it is necessary to employ high frequency heads and a tape transport capable of moving the tape at high velocities past the air gap in the head.

To reduce the overall length of the tape, the diameter of the reel upon which it is wound and the velocity of the tape, in some forms of tape recorders, a plurality of heads are provided on a rotating drum or spindle. As the tape moves past the drum, the drum rotates so that the heads scan diagonally across the tape. The heads thereby form a series of tracks that extend diagonally across the magnetic tape. Depending upon the obliquity of the tracks, the velocity at which the tape moves past a head will be many times greater than the lineal velocity of the tape past the drum. The accuracy with which the signals are recorded and reproduced is dependent upon the motion of the heads being accurately synchronized with the motion of the tape and the diagonal tracks thereon. This represents a major problem which has not been entirely satisfactorily solved. It is also necessary to synchronously switch between the successive heads so that the correct head is operative as its respective track moves therepast. This is a major problem which also has not been entirely satisfactorily solved. It is further necessary that all of the various heads be precisely matched with each other and that the drum and heads be carefully dynamically balanced to prevent fluctuations in the signals from the successive heads. This is also a major problem.

It is the purpose of the present invention to provide frequency division multiplexing means which will overcome the foregoing difficulties. More particularly, it is the purpose of this invention to provide frequency division multiplexing means for use with tape recorders or similar narrower band devices which will subdivide wide band signals such as video signals into a plurality of component signals having narrower and lower frequency bands. Each of the component signals are within a sufficiently low frequency range to permit them to be magnetically recorded and reproduced by a plurality of stationary recording heads. The original signal will thus be recorded as a series of parallel tracks that extend longitudinally of the tape.

The original signal is divided into the component signals by means of a Fourier analysis or a so-called running wave analysis. In such an analysis, the original wide band signal is operated upon by $n$ different interrelated harmonic control signals to provide a plurality of signals that represent the time-varying coefficients that are to be recorded. In the particular embodiment disclosed herein the control signals correspond to a DC signal, a fundamental sine signal, a fundamental cosine signal and at least one signal that is a harmonic of the fundamental. These control signals are effective to divide the original signal into corresponding component signals with frequency ranges that extend from about 0 to $1/n^{\text{th}}$ of the bandwidth of the original signal where $n$ equals the number of components. To reproduce the original signal, the various component signals are operated upon by control signals that are of the same frequency and phase as the original squarewave control signals to produce resultant signals. The resultant signals are then recombined or added together to reform the original wide band signal with little or no distortion of the signal in either frequency or phase.

These and other features and advantages of the present invention will become readily apparent from the following detailed description of one embodiment of the present invention, particularly when taken in connection with the accompanying drawings wherein like reference numerals refer to like parts, and wherein:

FIGURE 3 is a diagrammatic showing of a matrix of signals recorded on a magnetic tape by the recording means of FIGURE 1 and reproduced by the reproducing means of FIGURE 2; and FIGURES *4a*, *4b* and *4c* are a series of waveforms present in various portions of the recording and reproducing means of FIGURES 1 and 2.

Figures 1, 2:
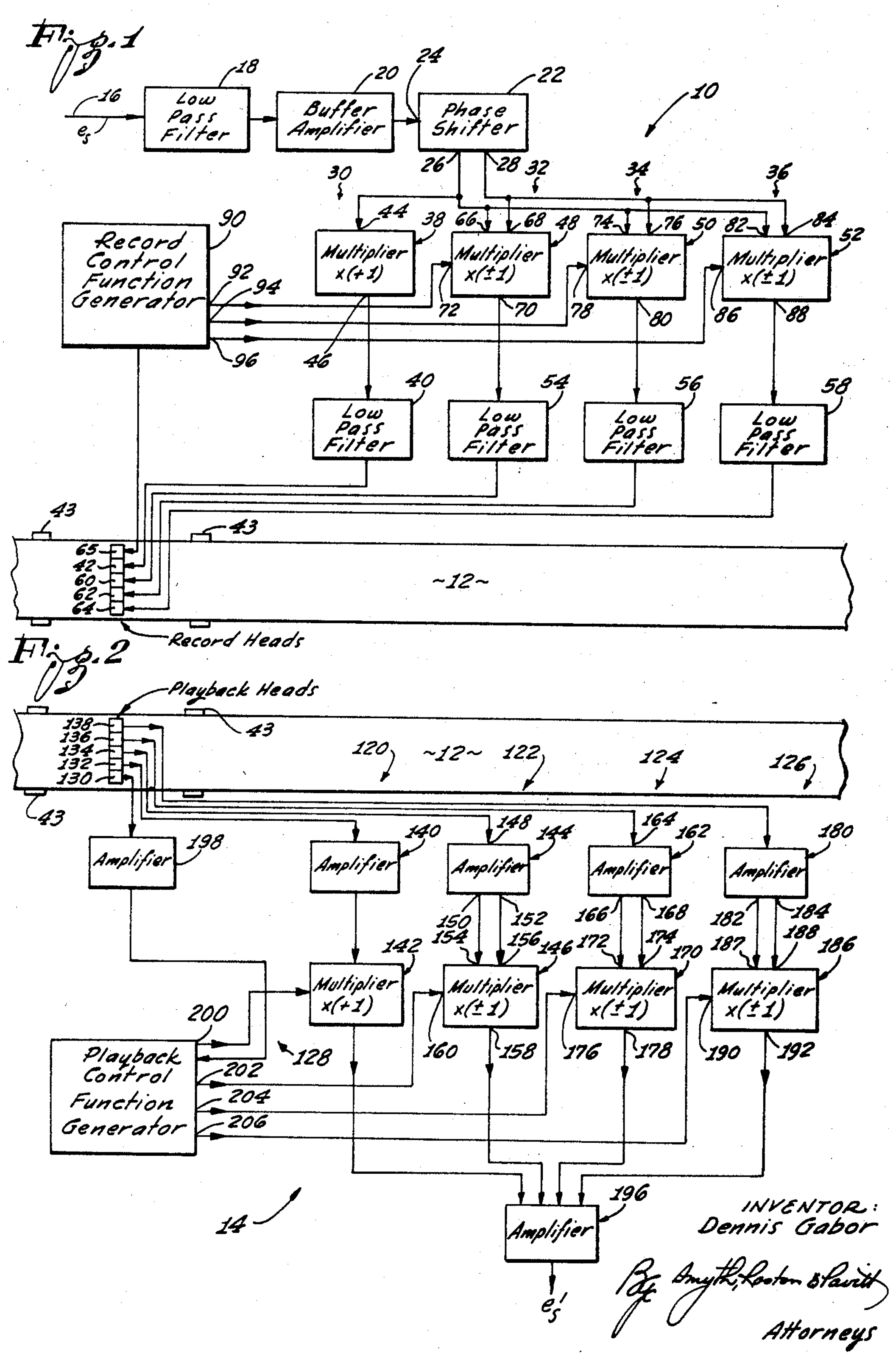
FIGURE 1 is a block diagram of magnetic tape recording means employing frequency division multiplexing means embodying one form of the present invention.
FIGURE 2 is a block diagram of a magnetic tape reproducing means employing the frequency division multiplexing means embodying one form of the present invention and being adapted to reproduce the signals recorded by the recording means of FIGURE 1.

Referring to the drawings in more detail, the present invention is particularly adapted to be embodied in a magnetic tape recorder 10 employing frequency division multiplexing means capable of dividing a wide band signal into a plurality of narrower band component signals of lower frequencies and recording them on a tape 12 and to be embodied in a magnetic tape reproducer 14 for scanning the tape 12 and reproducing the recorded signals and employing frequency division multiplexing means for combining the reproduced signals to reconstruct the original signal.

As will become apparent subsequently, each of the lower frequency or component signals is obtained by means of a continuous Fourier or running wave analysis of the original broadband signal. Thus, each of the component signals may be considered as corresponding to the various components that would be obtained by means of a Fourier expansion of the original signal. The wave analysis may be employed to divide the original signal into any desired number of lower frequency signals to provide $n$ component signals. Each of the resultant component signals will be in a base band of frequencies that extends from about 0 cycles to about $1/n$th of the maximum frequency of the original signal.

Although the original signal may be divided into any desired number of component signals, there are certain numbers of component signals that have important advantages from a practical standpoint. The number of component signals should be just large enough to insure the bandwidth of the component signal being in a low enough range to permit recording by means of readily available recording heads and related equipment.

By way of example, in one embodiment the original signal is divided into four separate component signals whereby each component signal covers a frequency band equal to one quarter of the bandwidth of the original signal. In the event the original signal is a video signal covering a bandwidth up to about 5 or 6 megacycles, the component signals will cover a band up to about 1¼ or 1½ megacycles, respectively. Recording signals of these frequencies is well within the capabilities of the present state of the art of recording on a magnetic tape. A signal having such a range of frequencies can be recorded by means of a stationary head that lays down a track longitudinally of the tape.

It should also be noted that if the four separate component signals are obtained by means of a running wave analysis employing square waves, the resultant component signals may be recorded in the form of a matrix pattern that is both orthogonal and uni-amplitude. By orthogonal matrix is meant that if the terms in one row of the matrix are individually multiplied by the corresponding terms in another row, the sum of the products will always be equal to zero. By uni-amplitude is meant that if each term in a row is individually squared, the sum of the squares for each of the rows will always be a constant.

Recording means 10 for dividing a signal into four separate component signals by means of a Fourier Analysis and recording the resultant components on the magnetic tape 12 is shown in FIGURE 1. The recording means 10 includes an input 16 for being interconnected with a source of the signals $e_s$ to be recorded. The source may include data processing apparatus, a television camera, etc., and may supply signals $e_s$ of any desired variety and of any desired frequency range. Furthermore, the signal $e_s$ may be divided into any desired number of component signals. However, in the present instance, in order to simplify the exploration the signal $e_s$ is divided into four separate component signals.

It has been found desirable for the input 16 to the recorder to include a filter 18. One of the primary purposes of this filter 18 is to eliminate noise and those portions of the video signal $e_s$ outside of the frequency band to be recorded. If a video or similar signal is to be recorded, it will normally be contained within a band that extends from about 0 cycles to some upper limit such as 5 or 6 megacycles. Accordingly, the filter 18 may be of the so-called low pass variety having an upper cutoff frequency equal to or slightly greater than the upper limit of the input signal, for example, 5 or 6 megacycles. The filter 18 should have substantially uniform characteristics over its entire bandwidth so as to produce minimum phase or other distortions. Thus, the signal present on the output of the filter 18 will be substantially identical to the video signal $e_s$ on the input 16 except for removal of the spurious portions that have frequencies beyond the range to be recorded.

The output from the filter 18 is connected to the input of a buffer amplifier 20. This amplifier 20 may include some gain to increase the amplitude of the filtered signal to a more useful level. The amplifier 20 will also be effective to act as a buffer for isolating the signal source and the filter 18 from the effects of the recorder 10 and isolating the recorder 10 from the effects of the signal source and filter 18. This amplifier 20 should be of the wide band or video variety with a uniform gain over the entire bandwidth of the signal $e_s$. It will thus be seen that the signal $e_s$ at the output of the amplifier 20 will be substantially identical to the output from the filter 18 except that it may have a greater amplitude.

Phase shifting means 22 having a single input 24 may be interconnected with the output of the buffer amplifier so as to receive the amplified signals. The phase shifter 22 may be of any suitable variety having substantially uniform characteristics over the entire frequency range of the signal $e_s$. The phase shifter 22 includes a pair of separate outputs 26 and 28 and is capable of dividing the signal on the input 24 into a pair of separate but substantially identical signals. These signals present on the two outputs 26 and 28 will be isolated from each other. The phase shifter 22 is effective to shift the phase of one or both of these signals so that the signals on the two outputs 26 and 28 will be out of phase with each other by some predetermined amount. In the present instance, the phase shifter 24 is effective to cause the two signals to be 180° out of phase.

It may thus be seen that the two outputs 26 and 28 will carry a pair of signals that are identical to each other and to the input signal $e_s$. The signal on the first output 26 will have a constant phase relation with the signal on the input 24. This signal, for convenience, will be referred to as the in phase signal. The signal on the second output 28 is 180° out of phase with the signal on the input 24 and the in phase signal on the first output 26. The signal on the second output 28 will accordingly be referred to as the out of phase signal.

The two outputs 26 and 28 from the phase shifter 22 are connected to the inputs of a plurality of separate recording channels 30, 32, 34 and 36 so as to supply the pair of out of phase signals to the channels. The number of these channels 30, 32, 34 and 36 is equal to the number of component signals into which the original signal $e_s$ is to be divided. As has been stated before, although there may be any desired number, in the present embodiment, there are four separate channels for recording four separate component signals.

Each of the channels 30, 32, 34 and 36 corresponds to one of the various component signals into which the original signal may be divided by a continuous Fourier analysis. Accordingly, the channels will be designated as the first or DC channel 30, the second or fundamental harmonic sine channel 32, the third or fundamental harmonic cosine channel 34 and the fourth or second harmonic channel 36. Each of these channels is very similar to all of the other channels.

The first or DC channel includes a multiplier 38, a low pass filter 40 and a record head 42. The multiplier 38 may be of any conventional design capable of continuously multiplying a signal by some predetermined signal. In the present instance, this signal has a DC frequency whereby the multiplier 38 multiplies the signal by +1. This multiplier 38 may be essentially a conventional amplifier having a single input 44 and a single output 46 with a constant gain. Thus, a constant relationship will be maintained between the signal on the input 44 and the signal on the output 46 whereby the multiplier 38 may be considered as multiplying the input signal by a +1.

The input 44 to the multiplier 38 is connected directly to the first output 26 from the phase shifter 22. The signal on this output 26 will be a continuous signal that is virtually identical to the signal from the output of the low pass filter 18 and is in phase with the filtered signal. This continuous signal will always pass through the multiplier 38 and be present on the output 46 from the multiplier 38. The signal on the output will also be a continuous signal which is identical to the filtered signal from the filter 18.

The filter 40 may have a single input and a single output. The input is connected directly to the output 46 of the multiplier 38 so as to receive the signal multiplied by +1. It is the primary purpose of this filter 40 to limit the frequency of the signal to a level that corresponds to the frequency of the component signals and is compatible with the capabilities of the recording head 42. Accordingly, this filter 40 may be of a low pass variety having an upper cutoff frequency approximately equal to the upper limit of the component signal or the cutoff frequency for the record head 42. For example, if as in the present instance a video signal $e_s$ of up to 5 or 6 megacycles is to be recorded by dividing it into four separate component signals, the filter 42 would normally have an upper cutoff frequency on the order 1¼ or 1½ megacycles.

The filter 40 has substantially uniform characteristics over its entire pass band. The filter 40 also should produce no phase or other distortions in the signal. It may thus be seen that the signal from the output of the filter 40 will be identical to the lower quarter of the original signal $e_s$ and will have a constant phase with respect to the signal from the amplifier 20.

The record head 42 is interconnected with the output from the filter 40 so as to receive the filtered signal therefrom. This record head 42 may be of a conventional design having a pass band which is at least equal to the bandwidth of the component signal. The head 42 includes an air gap which is positioned adjacent the tape 12 and is effective to produce a magnetic flux field that extends into the tape 12. Preferably, the head 40 is mounted in a stationary position whereby the air gap will scan the tape 12 at a uniform distance from the edge of the tape. The head 42 will thereby lay down a straight and continuous track that extends longitudinally of the tape 12. The tape 12 is driven at a uniform speed by a tape transport 43.

It will thus be seen that the signal to be recorded will be transferred through the low pass filter 18, the buffer amplifier 20 and the phase shifter 22 so as to be present on the first output 26. The in phase signal on this output 26 will then be fed continuously through the multiplier 38 and low pass filter 40 to the record head 42. This signal will be continuous and will be identical to the portion of the signal in the lower quarter of the signal $e_s$ and will not be altered therefrom in any way.

All of the remaining channels 32, 34 and 36 are very similar to each other as well as being similar to the DC channel 30. Each of these channels also includes a multiplier 48, 50 and 52, a low pass filter 54, 56 and 58 and a recording head 60, 62 and 64.

The multiplier 48 in the second or fundamental harmonic sine channel 32 includes a pair of signal inputs 66 and 68, a single output 70 and a control input 72. The first input 66 is interconnected with the first output 26 from the phase shifter 22 so as to receive the in phase signal. The second input 68 is interconnected with the second output 28 so as to receive the out of phase signal. It will thus be seen that the multiplier 48 will continuously receive both the in phase and the out of phase signals.

The multiplier 48 may be similar to the multiplier 38 in the DC channel in that it includes the same amount of gain. However, the multiplier 48 also includes a control input 72 so as to be responsive to a control signal and multiply the input signal by the control signal. In the present embodiment, when the control signal on the input 72 is at a first level, the multiplier 48 will be effective to permit the in phase signal on the first input 66 to pass through the multiplier 48 to the output 70 substantially the same as occurs in the first multiplier 38. However, when the control signal on the input 72 is at a second level, the multiplier 48 will be effective to block the in phase signal and permit only the out of phase signal on the second input 68 to pass through the multiplier 48 to the output 70. As a consequence, the signal on the output 70 will have its phase inverted at a time and frequency that is determined by the time and frequency of the control signal.

The gain of the multplier 48 is preferably identical to the gain of the first multiplier 38 and is constant irrespective of the state of the signal on the control input 72. As a consequence, this multiplier 48 may be considered as being effective to mulitply the video signal by +1 when the control signal is at the first level and −1 when the control signal is at the second level.

The output 70 from the multiplier 48 is interconnected with the input to a filter 54 so as to feed the product signal thereto. This filter 54 may be substantially identical to the first filter 40 so as to pass only the portion of the product signal that is within a frequency range that corresponds to the lower quarter of the bandwidth of the input signal. As a consequence, the signals from the filter 54 will be in a frequency range identical to that fed to the head 42.

The output of the filter 54 is connected to the second record head 60 so as to supply the filtered signals thereto. The filtered signal will lie completely within a frequency band having an upper cutoff frequency equal to the cutoff frequency of the components. The record head 60 may be identical to the head 42 and includes an air gap for producing a magnetic flux field similar to the component signal. The head is preferably mounted in a stationary position so that the air gap will scan the tape in a straight line and lay down a second track similar to and parallel to the first track. Since the filter 54 will limit the signal to a range of frequencies compatible with the head 60, the entire filtered signal will be recorded on the tape 12.

The third channel or fundamental harmonic cosine channel 34 may be substantially identical to the second or fundamental harmonic sine channel 32. The mutliplier 50 in this channel includes a pair of inputs 74 and 76 that are connected to the two outputs 26 and 28 from the phase shifter 22. As a result, this multiplier 50 will receive the in phase signal and the out of phase signal. A control input 78 is also provided that will be effective to control whether the in phase or out of phase signal will pass through the multiplier 50 and be present on the output 80. As a consequence, the signal on the output 80 will be a product corresponding to the input signal multiplied by +1 or −1. The frequency and time at which the phase of the product signal is inverted is determined by the frequency and phase of the control signal on the control input 78.

The output from the multiplier 50 is interconnected with the filter 56. This filter 56 may be substantially identical to the preceding filters 40 and 54 in that it is a low pass filter having an upper cutoff frequency corresponding to the upper limit of the component signals.

The output of the filter 56 is connected to the third record head 62 so as to pass the filtered signal to the head 62. This head 62 includes an air gap similar to the preceding air gaps and is positioned so that the air gap will scan a third track on the tape 12. This head 62 is also preferably stationary whereby the track will extend longitudinally of the tape 12 and be parallel to the first tracks.

The fourth or second harmonic channel 36 may be substantially identical to the fundamental harmonic channels 32 and 34. The multiplier 52 also includes a pair of inputs 82 and 84 which are connected with the two outputs 26 and 28 from the phase shifter 22 so as to continuously receive the in phase signal and the out of phase signal. The multiplier 52 may also include a control input 86 which will be responsive to a control signal whereby either the in phase or the out of phase signal will be present on the output 88.

The output of the multiplier 88 is, in turn, interconnected with the input to the low pass filter 58 so as to supply the product signal to the filter. This filter 58 is also of the low pass variety having an upper cutoff frequency substantially equal to the upper frequency of the component signal.

The output of the filter 58 is interconnected with the input to the fourth record head 64 whereby the filter signal will be fed to the head. This head 64 may be substantially identical to the preceding heads 42, 60 and 62 and includes an air gap for forming a fourth track on the tape 12. This head 64 is also preferably stationary so that the track will extend longitudinally of the tape 12 parallel to the three tracks laid down by the heads 42, 60 and 62.

It will thus be seen that the input signal $e_s$ will be fed through the phase shifter 22 so as to be divided into an in phase signal and an out of phase signal on the outputs 26 and 28. These two signals will then be multiplied by $+1$ or $-1$ in the four channels 30, 32, 34 and 36 so as to form four component signals in response to the control signals present on the control inputs 72, 78 and 86.

In order to provide the control signals for the inputs 72, 78 and 86 on the multipliers 48, 50 and 52, a record control function generator 90 may be provided. This generator 90 includes a separate output 92, 94 and 96 for each of the control inputs 72, 78 and 86. The first output 92 provides a control signal which has a fundamental frequency. This frequency may be equal to half of the maximum frequency of the original signal $e_s$. Thus, if the upper band limit is 5 or 6 megacycles, this control signal will have a frequency of 2½ or 3 megacycles, respectively. Output 92 is connected to the input 72 so as to supply the control signal thereto. As this control signal varies, it will be effective to cause the multiplier 48 to switch states whereby the signals on the inputs 66 and 68 will alternately appear on the output 70.

It will thus be seen that the signal from the multiplier 48 will be a product signal which corresponds to the original signal $e_s$ being alternately multiplied by $+1$ and $-1$ in accordance with the control signal.

The second output 94 is interconnected with the control input 78 of the multiplier 50 so as to supply a second control signal thereto. This signal will have the same fundamental frequency as the first control signal but its phase will be shifted 90° from the phase of the first control signal. As a result, these two control signals may be considered as having a sine and cosine relationship.

It may thus be seen that the product signal from the multiplier 48 will be a signal having the fundamental frequency and a sine relationship while the product signal from the third multiplier 50 will be of the fundamental frequency but having a cosine relationship.

The third output 96 from the control generator 90 provides a signal having a frequency which is double the frequency of the first two outputs or equal to the maximum frequency of the video signal $e_s$. The output 96 is connected to the control input 86 so that the multiplier 52 will alternately multiply the input signal $e_s$ by $+1$ and $-1$. The signal from the multiplier 52 will accordingly correspond to the second harmonic of the fundamental signals in the channels 32 and 34.

In order to record a wide band signal $e_s$, the input 16 may be connected to a source that supplies the signals $e_s$. An example of such a signal is shown in the top line of FIGURE 4*a*. For illustrative purposes, the signal $e_s$ is shown as a squareware delta pulse 98. A delta pulse is a pulse having a duration equal to the duration of a half cycle of the control signal on the output 96. The pulse 98 commences at time $T=1$ and terminates at time $T=2$.

This signal or pulse 98 will pass through the filter 18 and amplifier 20 to the phase shifter 22. The phase shifter will be effective to produce identical pulses on the outputs 26 and 28. However, the two signals will be out of phase by 180°. These two signals will be fed to the channels 32, 34 and 36.

Only the in phase signal on the output 26 will be fed to the channel 30 and the multiplier 38. This multiplier 38 will be effective to continuously multiply this signal by a $+1$ at all times. As a consequence, the multiplier 38 may be considered as being controlled by a DC signal similar to the signal 104 in FIGURE 4*a*. When the pulse 98 occurs, it will pass through the multiplier 38 to produce a positive pulse 100 on the output 46. This pulse 100 will then be fed through the low pass filter 40 to the record head 42. Since the filter 40 is of the low pass variety, it will block the high frequency portions of the pulse 100 and allow a signal such as the wave 102 to pass to the record head 42 and be recorded on the tape 12. It should be noted that since the multiplier 38 is always multiplying by $+1$, the pulse 100 and the recorded signal 102 will be positive, i.e., in phase.

The signals from the outputs 26 and 28 will be fed to the two inputs 66 and 68 of the multiplier 48. This multiplier 48 will operate in response to the signal from the output 92. This will be similar to the squarewave control signal 106 in FIGURE 4*a*. During the interval the pulse 98 occurs, the signal 106 will be positive whereby a positive pulse 108 will be fed to the filter 54. Since the filter 54 is of the low pass variety, it will allow only the low frequency wave 110 to pass to the head 60 so as to be recorded thereby. It will be noted that since the signal 106 is positive during this interval, the pulse 108 and wave 110 will be positive also.

The two out of phase signals entering the channel 34 will be fed to the multiplier 50. The multiplier 50 is responsive to the control signal 112. As a consequence, when the pulse 98 occurs, the pulse 114 will be fed to the filter 56. The filter 56 will allow only the low frequency wave 116 to pass therethrough and reach the head 62. The signal 112 is negative during the occurrence of the pulse 98. Accordingly, the multiplier 50 will be multiplying by $-1$ and the pulse 114 and wave 116 will be negative. It should be noted that the control signals 106 and 112 are of identical frequency, but are of a sine and cosine relationship due to the 90° phase difference.

The out of phase signals will be supplied to inputs 82 and 84 of multiplier 52 wherein they will be multiplied by $+1$ and $-1$ in response to the control signal 118. When the pulse 98 occurs, the signal 118 will be negative and, accordingly, the pulse 117 will be negative. The filter 58 will then allow the negative wave 119 to be fed to the head 64 so as to be recorded.

Since the waves 102, 110, 116 and 119 are all within the frequency range of the heads 42, 60, 62 and 64, they will be recorded onto the tape. Although the pulse 98 has been shown as occurring at a particular period of time, it will be readily apparent that it would be divided in the same manner at any other time. Also, any other signal having any desired shape may be analyzed in the foregoing manner to show the form of the signals to be recorded.

The various signals 104, 106, 112 and 118 will switch the multipliers 38, 48, 50 and 52 in a pattern similar to the matrix in FIGURE 3. The matrix includes four rows corresponding to the channels and four columns corresponding to the time intervals. At the end of the fourth interval, i.e., the fifth interval the matrix will repeat itself.

During the first interval of time, the control signals 104, 106, 112 and 118 are all positive. Accordingly, all of the signals will be multiplied by a +1. However, during the second interval of time, signals 112 and 118 will reverse and the multipliers 50 and 52 will multiply by a −1. Similarly, during the third interval, only the multipliers 48 and 50 will be multiplying by −1 and during the fourth interval only multipliers 48 and 52 will be multiplying by −1. After each matrix is completed, the matrix will repeat itself in exactly the same sequence.

It may be observed that the matrix of FIGURE 3 has two distinctive characteristics. First of all, it is orthogonal. Secondly, it is uniamplitude. An orthogonal matrix is a matrix wherein the sum of the products obtained by individually multiplying the terms in one column with a corresponding term in another column will always be equal to zero. For example, if the various terms at time 1 are multiplied by the various terms at time 2, there will be two +1 products and two −1 products which form a sum equal to zero. This same relationship will be maintained between all of the successive terms at the various times.

A uniamplitude matrix is a matrix wherein the sum of the squares of all of the terms in a row are constant. In the present instance, it will be seen that by squaring each of the terms, a +1 will be provided for each term and since there are four terms in each row, the sum will always be equal to four.

It may be seen that the signal $e_s$ on the input 16 will be divided into four separate component signals by a continuous Fourier analysis. Each of these component signals will cover a bandwidth extending from about 0 to approximately one-quarter of the upper limit of the bandwidth of the original signal $e_s$. The component signal formed in channel 30 will contain the intelligence present in the lower quarter of the original signal $e_s$. The fundamental signals formed in the second and third channels 32 and 34 will include the intelligence present in the portion of the original signal $e_s$ in a frequency range extending from about one-quarter to about three-quarters of the original bandwidth. The fourth component signal formed in the channel 36 will be a second harmonic of the fundamental and will contain the intelligence present in a frequency range of about three-fourths to the maximum of the bandwidth. All of these various component signals will be recorded by the record heads 42, 60, 62 and 64 to form four parallel signal tracks extending longitudinally of the tape 12.

It may be seen that the DC control signal will be effective to extract the portion of the signal $e_s$ looking from zero frequency toward the upper frequencies of the signal $e_s$. The second harmonic control signals will extract the portion of the signal $e_s$ looking from the maximum frequency toward the zero frequency. The two fundamental frequency signals will extract the portion of the signal $e_s$ centered at the middle frequency and looking in both directions.

The fifth record head 65 may be juxtaposed to the first four record heads for recording a fifth track. The record head 65 is interconnected with an output from the record function generator 90 so as to record a sync signal. This sync signal will be synchronized with the control signals on the outputs 92, 94 and 96 and will be in a frequency range which can be conveniently recorded. As a consequence, the sync signal recorded in the fifth track will always bear some predetermined and constant relationship with the component signals recorded in the first four tracks by the record heads 42, 60, 62 and 64.

The reproducing means 14 for reproducing the component signals and combining them into a signal $e'_s$ that is the same as the original signal $e_s$ are shown in FIGURE 2. The reproducing means 14 includes the same number of channels as the recording means 10. More particularly, it includes four signal channels 120, 122, 124 and 126 and a synchronizing channel 128. The various signal channels perform essentially the same functions as the channels in the recorder 10. Accordingly, they may be identified in the same manner, i.e., a first or DC channel 120, a second or fundamental harmonic sine channel 122, a third or fundamental harmonic cosine channel 124 and a fourth or second harmonic channel 126.

Each of the channels 120 to 128, inclusive, includes a pickup head 130, 132, 134, 136 and 138 that is mounted to scan the appropriate track on the tape. All of the pickup heads 130 to 138, inclusive, are rigidly mounted in fixed positions so as to scan the parallel tracks extending longitudinally of the tape 12. The tape 12 is driven at a uniform velocity by a tape transport 43. The physical relationship of the pickup heads 132 to 138, inclusive, is similar to the physical relationship of the record heads 42, 60, 62 and 64 whereby the component signals developed by the pickup heads 130 to 138, inclusive, will all have the same phase or time relationships as the component signals fed into the record heads 42, 60, 62, 64 and 65.

The pickup head 132 is positioned to scan the first track laid down by the record head 42 and to reproduce the DC component signal. This signal will cover a frequency band of about 0 to 1 $n$th of the original signal where $n$ is the number of channels, i.e., ¼ of the original bandwidth in the present instance. This is the DC component signal and will be substantially identical to the lower one-quarter of the signal from the multiplier 38 and to the lower portion of the original signal $e_s$.

The output of the head 132 is connected to the input of an amplifier 140 to increase the strength of the signal to a more useful level. This amplifier 140 is a wide band or video amplifier which is capable of amplifying the signal developed by the head 132 with little or no distortion in the signal.

The output from the amplifier 140 is interconnected with an input to multiplier 142. This multiplier 142 includes a single input and a single output. Since the signal in this channel 120 is substantially identical to the fundamental or lower quarter of the original signal, it is not necessary to modify the signal in any way. As a result, this multiplier 140 may be similar to the multiplier 38 and always multiply the signal by +1. Accordingly, this multiplier 140 may be an amplifying device having a constant gain.

The second or fundamental harmonic sine channel 122 is similar to the first or DC channel 120, in that it also includes pickup head 134, an amplifier 144 and a multiplier 146. The pickup head 134 is positioned to scan the second track and reproduce a signal that is substantially identical to the fundamental sine signal from the filter 54 in the second record channel 32. This signal will thus cover a frequency band identical to the band of the signal in the first channel 120.

The amplifier 144 may be substantially identical to the amplifier 140 in the fundamental channel except that it includes a single input 148 and a pair of outputs 150 and 152. The input 148 is connected to the playback head 134 so as to receive the fundamental harmonic sine signal. The amplifier 144 is effective to divide this signal into two identical signals with each output 150 and 152 having a signal thereon. The amplifier 144 also includes phase shifting means that will shift the phase of one or both of the signals whereby the signals on the outputs 150 and 152 will be out of phase by the same amount as the two signals on the outputs 26 and 28. In the present instance, this is 180°. The signal on the output 150 will accordingly be called the in phase signal and the signal on the output 152 will be called the out of phase signal. The amplifier 144 has a gain that will insure the signals on the outputs 150 and 152 being of identical amplitudes and of the same amplitude as the signal from the amplifier 140.

The multiplier 146 may be similar to the fundamental multiplier 142 and to the multipliers in the recorder. The multiplier 146 includes a pair of signal inputs 154 and 156, a single output 158 and a control input 160. The two inputs 154 and 156 are interconnected with the two outputs 150 and 152 from the amplifier 144 so as to receive the in phase and out of phase signals. The multiplier 146 is responsive to the control signal on the input and will pass the in phase signal on the input 154 to the output 158 when the control signal is at one level. However, when the control signal is at another level, only the out of phase signal on the input 156 will be permitted to reach the output 158. The amount of gain of the multiplier 146 is the same as the gain of the first multiplier 142 so that the signal on the ouput will always be the same. The multiplier 146 may thus be considered as multiplying the second component signal at input 148 by +1 or −1 in response to the control signal on the input 160.

The third or fundamental cosine channel 124 may be substantially identical to the fundamental sine channel 122. The pickup head 136 is mounted in a fixed stationary position so as to scan the third track laid down by the third recording head 62 and containing the recorded fundamental harmonic cosine signal. The output from the head 136 is interconnected with an amplifier 162 so as to supply the reproduced signal thereto.

The amplifier 162 may be substantially identical to the amplifier 144 in the second channel 122 and includes a single input 164 and a pair of outputs 166 and 168. The two outputs 166 and 168 contain identical signals which are 180° out of phase with each other. The signal on the first output 166 will be referred to as the in phase signal and the signal on the second output 168 will be referred to as the out of phase signal.

The multiplier 170 is substantially identical to the preceding multiplier 146 and includes a pair of signal inputs 172 and 174, a control input 176 and a single output 178. The two inputs 172 and 174 are interconnected with the pair of outputs 166 to 168 so as to continuously receive the in phase signal and the out of phase signal. The multiplier 170 will be effective to permit the in phase or the out of phase signal to pass through the multiplier 170 to the output 178 in response to the control signal present on the control input 176. It will thus be seen that this multiplier 170 will also be effective to multipy the fundamental harmonic cosine signal by +1 or −1 in response to the control signal.

The fourth channel 126 is substantially identical to the second and third channels. The playback head 138 is positioned to scan the fourth track laid down by the fourth recording head 64 and containing the recorded second harmonic signal.

An amplifier 180 similar to the preceding amplifiers 144 and 162 has the input thereof connected to the playback head 138 so as to receive the second harmonic signal. The amplifier 180 is effective to divide this signal into a pair of signals which will appear on the two outputs 182 and 184 and will be 180° out of phase with each other. The signal on the first output 182 will be the in phase signal and the signal on the second ouput 184 will be the out of phase signal.

A multiplier 186 identical to the preceding multipliers 146 and 170 is provided. The signal inputs 187 and 188 are interconnected with the outputs 182 and 184 of the amplifier 180 to as to receive the in phase and out of phase signals. The multiplier 186 will then pass the in phase signal or the out of phase signal to the output in response to the control signals present on the control input 190. It will thus be seen that this multiplier 186 will also be effective to produce a product signal which will be multiplied by +1 or −1 in substantially the same manner as in the preceding channels 122 and 124.

The four playback heads 132, 134, 136 and 138 will be effective to scan the four tracks and reproduce the four component signals. These component signals will then pass through their respective amplifiers 140, 144, 162 and 180 and multipliers 142, 146, 170 and 186 so as to appear on the output of the multipliers. The signal on the output of the first multiplier 142 will always be an in phase signal representing the lower one quarter of the input signal $e_s$. However, the signals on the outputs 158, 178 and 192 of the second, third and fourth multipliers 146, 170 and 186 will be a series of in phase and out of phase signals as determined by the control signals supplied to the control inputs 160, 176 and 190. These control signals will correspond to the fundamental sine and cosine signals and the second harmonic signal.

The outputs from all of the multipliers 142, 146, 170 and 186 are interconnected with the various inputs to a final amplifier 196. These inputs are electrically isolated from each other so that the various multipliers will not interreact with each other. However, the amplifier 196 is effective to combine or add the signals on the inputs to form a single output signal $e'_s$. This output signal $e'_s$ will thus be equal to the sum of the signals from the multipliers 142, 146, 170 and 186.

The sync channel 128 is interconnected with the various control inputs 160, 176 and 190 to the multipliers 142, 146, 170 and 186 so as to control the sequence in which the various component signals are multiplied by a +1 or a −1. This channel 128 is driven by the signals from the sync head 130. The sync head 130 is positioned in a fixed, stationary location so as to scan the sync track laid down by the record head 65 and reproduce the sync signal. This sync signal is amplified by amplifier 198 and then fed to a playback control function generator 200. All of the recording heads 42, 60, 62, 64 and 65 and playback heads 130, 132, 134, 136 and 138 are mounted in fixed locations. By properly adjusting the physical positions of these heads relative to each other, the phase and time relationships of the various reproduced signals will be identical to those of the recorded component signals. In addition, the recorded and reproduced sync signal will be in the same timed relations to the recorded and reproduced component signals.

The function generator 200 may be similar to the function generator 90 in the record portion 10. The generator 200 includes three separate outputs 202, 204 and 206 which are interconnected with the respective control inputs 160, 176 and 190 to the multipliers 146, 170 and 186. The function generator 200 is responsive to the signals from the sync head 130 so as to be a slave of the reproduced sync signals. The function generator 200 will provide control signals on the outputs 202, 204 and 206. The signals on the outputs 202 and 204 have the same fundamental frequency as the signals on the outputs 92 and 94 from the first function generator and the phase of these two signals will be separated by the same 90°. These control signals will thus correspond to the sine and cosine functions and will cause component signals from the amplifiers 144 and 162 to be multiplied by +1 and −1 in the multipliers 146 and 170 at the fundamental frequency and in quadrature relation. This multiplication will thus be similar to the corresponding multiplications which occur in record channels 32 and 34.

It may be appreciated that if the control signals on the inputs 160 and 176 are in exact phase and frequency registration with the control signals on the inputs 72 and 78, the multipliers 146 and 170 will reverse the phase of the component signals in exact synchronism with the phase reversals produced in the multipliers 48 and 50. As a consequence, the signals will be restored to their original form.

The output 206 is effective to produce a third control signal having a frequency double the frequency of the fundamental control signals. This signal will thus have the same frequency as the signal 118 and will correspond to the second harmonic. The fourth component signal present in channel 126 will be multiplied by a +1 and −1 in the multiplier 186 in the same manner as the signal in channel 36 is multiplied. Thus, the phase of the fourth component will be reversed in synchronism with the original reversal whereby the phase will be restored.

In order to reproduce the wideband signal $e_s$ recorded on the tape 12, the tape 12 may be fed through the reproduction portion 14 whereby the various tracks on the tape 12 will move past playback heads 130, 132, 134, 136 and 138. The record heads will thus reproduce the various component signals and sync signals. For illustrative purposes, the recorded signal may correspond to the pulse 98 whereby the various component signals will be substantially identical to the waves 102, 110, 116 and 119 of FIGURE 4*b*.

The signal reproduced by the head 132 and corresponding to signal 102 will be fed through the amplifier 140 and the multiplied 142. Since the multiplier 142 will always multiply the signal by +1, the signal 208 from the multiplier 142 will be unaltered. The signal 208 will then be fed through the first input to the amplifier 196 so as to be added with the other product signals.

The signal from the second head 134 will be fed through the amplifier 144 to the two inputs 154 and 155 of the multiplier 146. This multiplier will be effective to multiply the reproduced signal by +1 or —1 in accordance with the control signal fed from the output 202 to the input 160. This control signal will be substantially identical to the control signal 106 from the output 92 and will be positive during the first and second time intervals and negative during the third and fourth time intervals. As a consequence, during the first two time intervals, the signal from the amplifier 140 will be multiplied by +1 and during the third and fourth intervals, it will be multiplied by —1. The product signal 210 will be substantially identical to the recorded component signal 110 except that its polarity will be reversed during the third and fourth time intervals. The signal 210 will then be fed through the output amplifier 196 so as to be combined with the signal 208.

The signal reproduced by the head 136 will be fed through the amplifier 162 to the multiplier 170. The multiplier 170 will be effective to multiply the reproduced signal by a +1 and a —1 in accordance with the control signal transferred from the output 204 to the control input 176. This control signal will be substantially identical to the control signal 112. More particularly, it will be of the fundamental frequency and delayed 90° from the control signal applied to the control input 160 of the multiplier 146. The control signal will be positive during the first and fourth time intervals and negative during the second and third time intervals. The product signal 212 will be identical to the recorded component signal 116 except its phase will be inverted during the second and third time intervals. This product signal 212 will be fed through the third input to the amplifier 196 so as to be added to the product signals 208 and 210.

The signal reproduced in the playback head 138 will be fed through the amplifier 180 to the two inputs 187 and 188 of the multiplier 186. The reproduced signal will correspond to the recorded component signal 119 and it will be multiplied by a +1 and a —1 in accordance with the control signal transferred from the output 206 to the control input 190. The control signal corresponds to the control signal 118 and, accordingly, will be of the second harmonic frequency. This control signal will cause the fourth component signal to be multiplied by a +1 during the odd time intervals and a —1 during the even time intervals. Thus, the negative component signal 119 will be negative during the first and third time intervals and positive during the second and fourth time intervals. The product signal 214 will then be transferred from the multiplier 186 to the fourth amplifier 196 so as to be combined with the preceding product signals 208, 210 and 212.

It will be noted that during the first time interval the signals 208 and 210 will be positive but the product signals 212 and 214 will be negative. As a consequence, when these signals are added in the amplifier, they will produce a sum of zero. However, during the second time interval, all four of the signals will be a +1 and consequently will all be added together to produce a pulse 216. The pulse 216 will correspond to the original pulse

98 in the signal $e_s$ supplied to the input 16. It may be seen that during the third and fourth time intervals, the polarities of the various product signals 208 thru 214 will be inverted so that the sum of these signals will be zero. As a consequence, the output signal $e'_s$ will be substantially identical to the original input signal.

The first component signal will be effective to reconstruct the original signal $e_s$ extending from zero frequency looking toward the higher frequencies. The fourth component signal will be effective to reconstruct the original signal $e_s$ extending from the maximum frequency looking toward the lower frequencies. At the same time, the second and third component signals will be effective to reconstruct the center portion of the signal $e_s$ centered about the mid frequency and looking both ways from the center.

It may thus be seen that a recording and reproducing system has been provided that will be effective to divide a wideband signal into a plurality of narrow band signals by means of a Fourier analysis. More particularly, the wideband signal $e_s$ will be operated upon by four separate signals, i.e., a DC signal, a fundamental frequency sine signal, a fundamental frequency cosine signal and a second harmonic frequency signal. These signals will be effective to make a continuous Fourier analysis to be made of the signal $e_s$. More particularly, at the time the signal $e_s$ is multiplied by $$\begin{matrix}\cos\\ \quad 2nk\tau/T\\ \sin\end{matrix}$$

where $k$ runs from 0 to $\frac{1}{2}n$, $n$ being the number of channels, i.e., 4 in the present instance. It may be seen that when $k=0$ and $k=\frac{1}{2}N$, only the cos-signal will be taken.

The low-pass filter and/or the magnetic head multiplies this with a response function $h(t-\tau)$. At the reading time $t$ the contribution made at the previous time $\tau$ has the weight $h(t-\tau)$.

In the reproduction, at time $t$, the record in the $n$-channels is multiplied by the time-functions $$\begin{matrix}\cos\\ 2nk(t-t_0)/T\\ \sin\end{matrix}$$

The delay $t_0$ serves the purpose of providing the reproduction $t_0$ to the instant at which the response function is a maximum. The result of these operations is the reproduced signal $$s'(t)=\sum_{k=0}^{\frac{1}{2}n}\int_{-00}^{t}(\tau)\cos 2\pi k(t-t_0)\cos 2\pi k\tau/T+$$

$$\sin 2\pi k(t-t_0)/T\sin 2\pi k\tau/Th(t-\tau)d$$

$$=\int_{-00}^{t}\left\{\sum_{0}^{\frac{1}{2}n}\cos 2\pi K(t-t_0-\tau)/T\right\}s(\tau)h(t-\tau)d$$

The success of the method is based on the fact that the function under the last integral in curly brackets is nearly a delta-function, a function or pulse having a duration equal to the time intervals of the pulses in the second harmonic signal. It can be seen that it has a sharp maximum when all the arguments of the cos-functions vanish, i.e., at $$t-\tau=t_0$$

while at all other times the cos-functions of different order will nearly cancel out. If it were exactly a delta function, the result would be (apart from a constant factor), $$2'(t)=s(t-t_0)h(t_0)$$

that is to say the signal is exactly reproduced, with a certain delay $t_0$, whose purpose was to hit the maximum of the response function $h$.

In fact, the sum in the curly brackets is not infinitely sharp. It would be a delta function only if the sum were continued to infinity. It is, however, a good approximation to a delta-pulse in the finite waveband. The sum can be worked out in finite terms, using the formula $$\sum_{k=0}^{\frac{1}{2}n} \cos k\psi = \frac{1}{2}\frac{\sin \frac{1}{2}(N+1)\psi}{\sin \frac{1}{2}\psi} + 1$$

Though this does not give a quite exact reproduction, it has the unique advantage that the result never contains any periodicity with period T, thus the continuous Fourier analysis and synthesis will not show up the groups of $n$ picture points.

While only a single embodiment of the present invention has been disclosed and described herein, it will be readily apparent to persons skilled in the art that numerous changes and modifications may be made thereto. For example, although the original signal is divided into only four separate components, it will be possible to divide the signal into larger numbers of component signals and thereby reduce the bandwidth of each of the component signals to a lower level. In addition, the various signals may be multiplied by any desired amounts and not necessarily the same amounts. In the present instance, the various signals are multiplied by a +1 and a −1 as a matter of convenience. This can be accomplished by the use of very simple structures such as phase inverters and squarewave generators. Accordingly, it should be understood that the foregoing disclosure and description thereof are for illustrative purposes only and do not in any way limit the invention which is defined only by the claims which follow.

What is claimed is:

1. A frequency division multiplexer for dividing an original wide band signal into a plurality of narrow band component signals, said multiplexer including the combination of:

input means for receiving the original wide band signal and providing an in phase signal and an out of phase signal that are substantially identical to each other, said in phase signal and said out of phase signal being separated by 180°, a plurality of multipliers interconnected with the input means, each of said multipliers being effective to receive an in phase signal and an out of phase signal, a control input to each of the multipliers, said multiplier being effective to pass the in phase signal when the control input is at a first level and to pass the out of phase signal when the control signal is at a second level, a squarewave generator having a separate output for each of the control inputs to the multipliers, said generator being effective to generate squarewaves that vary between the first and second levels, at least a pair of the squarewaves having the same frequency and being disposed at right angles to each other, means interconnecting the control inputs with the outputs to the geneator to transfer the squarewaves to the control inputs, the control inputs being effective to cause its multiplier to pass the in phase signal when its squarewave is at its first level and to pass the out of phase signal when its squarewave is at its second level to thereby provide a product signal, and a filter interconnected with the multipliers for receiving the product signals therefrom, said filters having pass bands equal to the bandwidth of the component signal.

2. A frequency division multiplexer for combining a plurality of narrow band component signals into a single wide band signal, said multiplexer including the combination of:

a separate channel for each component signal for receiving the component signals, phase shifting means in at least a portion of said channels for receiving the component signal in its respective channel, said phase shifting means being effective to provide an in phase component signal and an out of phase component signal, a multiplier for each phase shifting means, said multiplier being interconnected with its respective phase shifting means for having the respective in phase and out of phase component signals transferred thereto, a control input to each multiplier being effective to allow the in phase signal to pass when the control input is at a first level and to allow the out of phase signal to pass when the control input is at a second level, control means for generating a separate squarewave for each of the multipliers, all of said squarewaves varying between the first level and the second level and having a frequency that is an integral multiple of a fundamental frequency that is within the bandwidth of the wide band signal, at least a pair of said squarewaves having the fundamental frequency and being 90° out of phase with each other, means interconnecting the control means with the control inputs to the multipliers for causing each of the multipliers to alternately pass the in phase and out of phase component signals in response to the respective squarewave to provide resultant signals, and means interconnected with the multipliers for combining the resultant signals to provide a wide band signal.

3. A frequency division multiplexer for dividing an original wide band signal into a plurality of component signals having bandwidths that are less than the bandwidth of the original signal, said multiplexer including the combination of:

an input for receiving the original wide band signal, a first channel interconnected with the input for receiving the original signal, filter means in said channel having a pass band that is effective to continuously pass only the low frequency portion of the original signal having the same bandwidth as the component signals, a pair of channels interconnected with the input for receiving the original signal, a multiplier in each of the channels in said pair for multiplying the original signal, control means for generating a plurality of control signals, at least a pair of said control signals having a fundamental frequency and having phases that are at right angles to each other, means interconnecting the control means with the multipliers for transferring said pair of control signals to the multipliers, each of the multipliers being effective to multiply the original signal at the same frequency and phase as its respective control signal to provide a pair of product signals, filter means interconnected with the multipliers for receiving the product signals, said filter means having a pass band substantially identical to the pass band of the first filter means to allow only the low frequency portions of the product signals to pass therethrough, at least one additional channel interconnected with the input for receiving the original signal, an additional multiplier in each of said additional channels for multiplying the original signal, means interconnecting the control means with each of the additional multipliers to supply separate control signals thereto, each of the last control signals being a harmonic of the fundamental frequency of the pair of control signals, each of said additional multipliers being effective to multiply the original signal therein at the same frequency and phase as its respective control signal to provide additional products signals, and additional filters interconnected with each of said additional multipliers for filtering the product signals, each of said additional filters having a passband substantially identical to the pass band of the first filter to allow only the low frequency portions of the product signals to pass therethrough.

4. A frequency division multiplexer for dividing an original wide band signal into a plurality of component signals having bandwidths that are less than the bandwidth of the original signal, said multiplexer including the combination of:

an input for receiving the original wide band siganl and providing an in phase signal and an out of phase signal, a first channel interconnected with the input for receiving one of the phase signals, filter means in said channel having a pass band that is effective to continuously pass only the low frequency portion of the phase signal having the same bandwidth as the component signal, a pair of channels interconnected with the input for receiving the in phase and out of phase signals, a multiplier in each of the channels in the pair for multiplying the original signal, each of the multipliers being effective to receive the in phase signal and the out of phase signal, a control input to each of the multipliers, said control inputs being effective to cause its multipliers to pass the in phase signal when the control input is at a first level and to pass the out of phase signal when the control input is at a second level, a squarewave generator for generating a plurality of squarewaves that vary between the first and second levels, at least a pair of said squarewaves having a fundamental frequency and being 90° out of phase with each other, means interconnecting the squarewave generator with the multipliers for transferring said pair of squarewaves to the multipliers, each of the multipliers being effective to alternately pass the in phase signal and the out of phase signal in response to its respective squarewave to provide product signals, filter means interconnected with the multipliers for receiving the product signals, said filter means having a pass band substantially identical to the pass band of the first filter means to allow only the low frequency portions of the product signals to pass therethrough, at least one additional channel interconnected with the input for receiving the original signal, an additional multiplier in each of said additional channels for receiving the in phase and out of phase signal, an additional control input to each of the additional multipliers, said control inputs being effective to cause its multiplier to pass the in phase signal when the input is at the first level and to pass the out of phase signal when the input is at the second level, said squarewave generator being interconnected with each of the additional control inputs to supply a separate squarewave to each multiplier, each of the additional squarewaves being a harmonic of one of the squarewaves in the first pair of squarewaves and effective to provide additional product signals, and additional filter means interconnected with each of the additional multipliers, said additional filters having substantially the same pass band as the first filter to pass only the lower frequency portion of the additional product signals.

5. A frequency division multiplexer for dividing an original wide band signal into four separate component signals having bandwidths that are approximately one quarter of the bandwidth of the original signal, said multiplexer including the combination of:

an input for receiving the original wide band signal, a first channel interconnected with the input for receiving the original signal, said channel being effective to continuously pass only the portion of the original signal in the lowest one quarter thereof to provide a component signal, a pair of channels interconnected with the input for receiving the original signal, a multiplier in each of the channels in said pair for multiplying the original signal by +1 and −1, a squarewave generator for generating a plurality of squarewaves, at least a pair of said squarewaves having a fundamental frequency that is equal to a predetermined fraction of the maximum frequency of the original signal, said pair of signals being at right angles to each other, means interconnecting the squarewave generator with the multipliers for transferring the separate squarewave in said pair to the multipliers, each of the multipliers being effective to multiply the original signal by +1 and −1 at the fundamental frequency and in phase with its respective squarewave to provide second and third resultant signals, a fourth channel interconnected with the input for receiving the original signal, a third multiplier in said fourth channel for multiplying the original signal by +1 and −1, said squarewave generator being interconnected with the third multiplier to supply a squarewave thereto, said last squarewave having a frequency that is double the fundamental frequency and being effective to multiply the original signal by +1 and −1 to provide a fourth resultant signal, and a filter interconnected with each of said multipliers for filtering the resultant signals, each of said filters having a passband equal to one quarter of the bandwidth of the original signal to allow only the component signals to pass therethrough.

6. A recorder dividing an original wide band signal into four separate narrow band component signals and recording the four component signals, said recorder including the combination of:

an input for receiving the original wide band signal, a separate channel for each component signal interconnected with the input for receiving the input signal, the first of the channels including a filter with a pass band that will allow only the lower one fourth of the original signal to pass, a separate multiplier in each of the three remaining channels, control means for generating a separate control signal for each of the multipliers, a control input for each multiplier, each of the control inputs being interconnected with said control means for receiving its respective control signal and causing the multiplier to multiply the original signal in response to the control signals to provide a separate product signal in each of the channels, a separate filter means interconnected with the multipliers for filtering the product signals, each of said filters having a pass band that is the same as said narrow band so as to pass only the component signals, and a separate recording head for each channel for recording the component signals.

7. A recorder dividing an original wide band signal into a plurality of narrow band component signals and recording the narrow band signals, said recorder including the combination of:

an input for receiving the original wide band signal, a separate channel for each component signal interconnected with the input for receiving the input signal, the first of the channels including filter means to pass only the component portion of the original signal within the narrow band, a multiplier in each of the remaining channels, said multipliers including a control input and being effective to multiply the original signal in response to a control signal on the input, control means for generating a separate control signal for each multiplier, said control means being interconnected with the control inputs to cause the multipliers to multiply the original signal in response thereto, a separate filter interconnected with each of the multipliers for filtering the product signals, each of said filters having a pass band that is the same as said narrow band so as to pass only the component signals, and a separate recording head for each of the channels, each of the recording heads being effective to record the component signals in separate tracks, said control means being effective to provide control signals that will cause the component signals to be recorded in the tracks in a series of similar orthogonal and uniamplitude matrices.

8. A recorder dividing an original wide band signal into a plurality of narrow band component signals and recording the narrow band signals, said recorder including the combination of:

an input for receiving the original wide band signal, said input including a phase inverter to provide an in phase original signal and an out of phase signal, a separate channel for each of the component signals, a multiplier in all but one of the channels, each of the multipliers being interconnected with the input receiving the in phase signal and the out of phase signal, control means for generating a separate squarewave control signal for each of the multipliers, a control input for each multiplier, each of the control inputs being interconnected with said control means for receiving a control signal, said squarewave being effective to cause multipliers to alternately pass the in phase signals and the out of phase signals in response to the squarewave signals to provide a plurality of product signals, a separate filter means interconnected with each of the channels for filtering the signals therefrom, each of said filters having a pass band that is the same as said narrow band so as to pass only the component signals, and a separate recording head for each of the channels, said recording heads being effective to record the component signals in four separate tracks.

9. A tape recorder for dividing an original wide band signal into a plurality of component signals having bandwidths that are less than the bandwidth of the original signal and for recording the resultant component signals, said recorder including the combination of:

a tape transport for moving a magnetic tape, an input for receiving the original wide band signal, a first channel interconnected with the input for receiving the original signal, said channel being effective to continuously pass only the lowest portion of the original signal that is within the bandwidth of the components, a recording head interconnected with the channel and positioned adjacent said tape for recording the passed signal, a pair of channels interconnected with the input for receiving the original signal, a multiplier in each of the channels in said pair for multiplying the original signal, control means for generating a plurality of control signals, at least a pair of said control signals having a fundamental frequency and being at right angles to each other, means interconnecting the control means with the multipliers for transferring the pair of control signals to the multipliers, each of the multipliers being effective to multiply the original signal at the same frequency and phase as the control signal supplied thereto, a recording head in each of the channels in the pair, said heads being interconnected with their respective multipliers to record the component signals therefrom, at least one additional channel interconnected with the input for receiving the original signal, additional multipliers in each of said additional channels for multiplying the original signal, said control means being interconnected with the additional multiplier to supply additional control signals thereto, each of the additional control signals being a harmonic of the first pair of control signals, and an additional recording head for each of the additional multipliers, each of the additional record heads being disposed adjacent said tape for recording additional tracks thereon.

10. A tape recording system for dividing an original wide band signal into a plurality of component signals having bandwidths that are less than the bandwidth of the original signal and for recording the resultant component signals and for reproducing the component signals and recombining them into the original wide band signal, said recorder including the combination of:

a tape transport for moving a magnetic tape, an input for receiving the original wide band signal, a plurality of record channels interconnected with the input for receiving the original signal, one of said record channels being effective to continuously pass only the lowest portion of the original signal within the narrow bandwidth to provide a first component signal, a multiplier in each of the remaining record channels in the plurality, each of the multipliers being effective to multiply the original signal, control means for generating a separate record control signal for each of the remaining channels, at least a pair of said control signals having a fundamental frequency and being at right angles to each other, means interconnecting the control means with the multipliers for transferring the control signals to the multipliers each of the multipliers being responsive to its respective control signal to multiply the original signal at the same frequency and phase as the control signal to provide a plurality of component signals, at least one additional record channel in said plurality interconnected with the input for receiving the original signal, and with the control means to receive a control signal that is a harmonic of the fundamental frequency, a separate recording head electrically interconnected with each of the channels to receive the component signals therefrom, said heads being positioned adjacent the tape for recording the component signals on the tape, a plurality of playback channels, a playback head electrically interconnected with each of the playback channels, each of the playback heads being positioned to scan the tracks recorded on the tape and reproduce the component signals, the first of the playback channels being effective to pass the first reproduced component signal to provide a resultant signal multiplier in each of the remaining playback channels, each of the additional multipliers being effective to multiply the component signal in its respective channel, control means interconnected with the additional multiplier to supply playback control signals, each of the playback control signals being substantially identical to a corresponding record control signal, said control means being interconnected with the additional multipliers to supply the control signals to the multipliers to provide resultant signals, and means interconnected with each of the playback channels to combine the resultant signals to reproduce the original signal.

11. A tape recorder for dividing an original wide band signal into a plurality of component signals having bandwidths that are less than the bandwidth of the original signal and for recording the resultant component signals, said recorder including the combination of:

a tape transport for moving a magnetic tape,
an input for receiving the original wide band signal,
a first channel interconnected with the input for receiving the original signal, said channel being effective to continuously pass only the lowest portion of the original signal that is within the bandwidth of the components,
a recording head interconnected with the channel and positioned adjacent said tape for recording the passed signal,
a pair of channels interconnected with the input for receiving the original signal,
a multiplier in each of the channels in said pair for multiplying the original signal alternatively by +1 and −1,
squarewave generator means for generating a plurality of squarewave control signals, at least a pair of said control signals having a fundamental frequency and being at right angles to each other,
means interconnecting the control means with the multipliers for transferring the control pair of signals in the pair to the multipliers, each of the multipliers being effective to multiply the original signal by +1 and −1 at the same frequency and phase as the squarewave control signal supplied thereto,
a recording head in each of the channels in the pair, said heads being interconnected with their respective multipliers to record the component signals therefrom,
at least one additional channel interconnected with the input for receiving the original signal,
additional multipliers in each of said additional channels for multiplying the original signal alternately by +1 and −1,
said control means being interconnected with the additional multiplier to supply additional squarewave signals thereto, each of the additional control signals being a harmonic of the first pair of control signals, and
an additional recording head for each of the additional multipliers, each of the additional record heads being disposed adjacent said tape for recording additional tracks thereon.

12. A tape recorder for dividing an original wide band signal into a plurality of component signals having bandwidths that are less than the bandwidth of the original signal and for recording the resultant component signals, said recorder including the combination of:

a tape transport for moving a magnetic tape,
an input for receiving the original wide band signal,
a plurality of channels interconnected with the input for receiving the original signal,
one of said channels being effective to continuously multiply the original signal by a constant amount and to pass only the lowest portion of the resultant signal that is within the narrow bandwidth to provide a first component signal,
a multiplier in each of the remaining channels in the plurality, each of the multipliers being effective to multiply the original signal differing amounts in response to a control signal,
control means for generating a separate control signal for each of the multipliers, at least a pair of said control signals having a fundamental frequency and being at right angles to each other and at least one additional control signal that is a harmonic of the fundamental frequency,
means interconnecting the control means with the multipliers for transferring the control signals to the multipliers, each of the multipliers being responsive to its respective control signal to multiply the original signal at the same frequency and phase as the control signal to provide a plurality of component signals, and
a recording head in each of the channels, said heads being positioned adjacent the tape to record the component signals from the channels in a plurality of parallel tracks,
said control means being effective to vary the control signals in a predetermined manner that will cause the component signals to be recorded in matrices that are orthogonal and uniamplitude.

13. A frequency division multiplexer for dividing an original wide band signal into a plurality of narrow band component signals and recombining the component signals into the original wide band signal, said multiplexer including the combination of:

a plurality of multipliers for receiving the wide band signal and multiplying the wide band signal in response to control signals to produce a plurality of product signals,
control means for generating a plurality of control signals, said control means being interconnected with the multipliers to supply control signals thereto,
filter means interconnected with the multipliers for filtering the product signals so as to pass only the low frequency portion of the product signal to thereby form component signals,
said control means being effective to generate a control signal having a frequency such that one of the component signals will include a portion of the wide band signal extending from zero frequency toward the maximum frequency of the wide band signal,
said control means being effective to generate a control signal having a frequency such that another of the component signals will contain the portion of the wide band signal extending from the maximum frequency toward the lower frequency,
said control means being effective to generate additional control signals having frequencies such that additional component signals will include the portion of the wide band signal between the preceding portions.

14. A frequency division multiplexer for making a Fourier analysis of an original wide band signal and dividing it into a plurality of narrow band component signals, said multiplexer including the combination of:

an input for receiving the original wide band signal,
a plurality of multipliers interconnected with the input for having the original wide band signal transferred thereto,
a control signal generator having a plurality of outputs and being effective to generate a plurality of control signals,
a control input to the multipliers interconnected with the outputs to the generator so as to receive one of the control signals so that the multiplier will multiply the original signal in response to the control signals and provide product signals, and
separate filters interconnected with said multipliers and having pass bands equal to the bandwidth of the component signals,
said generator being effective to provide control signals having frequencies and phases that are so related that the component signals will form the Fourier expansion of the wideband signal.

15. A frequency division multiplexer for making a Fourier analysis of an original wide band signal and dividing it into a plurality of narrow band component signals, said multiplexer including the combination of:

input means for receiving the original wide band signal,
a plurality of multipliers interconnected with the input means so as to receive the wideband signal, a control input to each of the multipliers for receiving separate control signals and causing the multipliers to multiply the original wide band signal in response to the control signal, a signal generator having a separate output for each of the control inputs to the multipliers, said generator being effective to generate a series of control signals that are interrelated in a Fourier progression having sine and cosine signals that are harmonics of each other.

means interconnecting the control inputs with the outputs to the generator to transfer the control signals to the control inputs, each control input being effective to cause its respective multiplier to multiply the wide band signal in response to one of the control signals to provide a separate product signal for each multiplier, and a filter interconnected with the multipliers for receiving the product signals and passing only the portion having frequencies in a range equal to the bandwidth of the component signal whereby the component signals will be the Fourier components of the wide band signal.

16. A tape recorder for dividing an original wide band signal into a plurality of narrow band component signals and recording the narrow band signals in a plurality of parallel tracks, said recorder including the combination of:

an input for receiving the original wide band signal, a plurality of multipliers interconnected with the input for receiving the wide band signals, control means for generating a plurality of control signals and feeding the signals to the multiplier for causing the multipliers to multiply the original signal in response to the control signals to provide a plurality of product signals, a separate filter means interconnected with the multipliers for filtering the product signals, each of said filters having a pass band that is the same as said narrow band signals so as to pass only the component signals, and a separate recording head interconnected with each of the filters for recording the component signals, said control means being effective to provide control signals that have frequencies and phases that will cause the component signals to be recorded on the tracks in a series of repeating matrices that are orthogonal and uniamplitude.

17. A frequency division multiplexer for dividing an original wide band signal into a plurality of narrow band component signals and recombining the component signals into the original wide band signal where the wide band signal has a particular frequency range, said multiplexer including the combination of:

at least a pair of first multipliers for receiving the wide band signal, each of the multipliers having a control input, means for continuously generating at least a pair of control signals at a particular frequency related to the frequency range of the wide band signal, said means being interconnected with said control inputs for causing the multipliers to continuously multiply the original signal by +1 at particular times and −1 at other times in accordance with the characteristics of the control signals to continuously provide the plurality of component signals, means for converting the control signals into resultant signals having frequencies less than but related to the frequency range of the wide band signal, at least a pair of second multipliers for receiving the resultant signals, said second multipliers having control inputs and being responsive to the control signals to multiply the resultant signals by +1 at the particular times and −1 at the other times in accordance with the characteristics of the control signals to continuously provide a plurality of product signals, and means interconnected with the second multipliers to combine the product signals to produce the original wide band signal.

18. A frequency division multiplexer for dividing an original wide band signal into a plurality of narrow band component signals, said multiplexer including the combination of:

an input for receiving the original wide band signal, at least a pair of multipliers interconnected with the input for having the wide band signal transferred thereto, each of the multipliers being constructed to continuously multiply the original signal by +1 at particular times and −1 at other times, first means for continuously generating at least a pair of control signals for continuously controlling the multiplication of the original signal by +1 and −1 in a particular phase displacement to each other in accordance with the characteristics of the control signals to obtain a pair of resultant signals having at each instant a particular phase displacement relative to each other, and means interconnecting said first means with the multipliers for causing each of the multipliers to continuously multiply the original signal by +1 at the particular times and −1 at the other times in accordance with the characteristics of the respective control signals to obtain the pair of resultant signals in accordance with the phase displacement between the control signals.

19. A frequency division multiplexer for dividing an original wide band signal into a plurality of narrow band component signals where the wide band signal has a particular frequency range and the narrow band of the component signals has a particular frequency relationship to the particular frequency range of the wide band signal but less than the particular frequency range of the wide band signal, said multiplexer including the combination of:

an input for receiving the original wide band signal, a plurality of multipliers interconnected with the input for receiving the original wide band signal from the input, a squarewave generator having a separate output for each of the multipliers, said generator being constructed to continuously generate at least a pair of squarewaves having a particular frequency related to the particular frequency range of the wide band signal and having a particular phase displacement relative to each other, a pair of control inputs each interconnected between an individual one of the multipliers and one of the outputs to the generator to receive an individual one of the squarewaves from the generator, each of the control inputs being effective to cause its multiplier to continuously multiply the original signal at the same frequency and phase as its respective squarewave to provide a continuous product signal representing the product of the wide band signal and the individual squarewave, and a pair of separate filters each interconnected with an individual one of said multipliers to filter the product signal from the individual multiplier, said filter having pass bands equal to the bandwidth of the component signals.

20. A frequency division multiplexer for combining a plurality of narrow band component signals into a wide band signal having a particular frequency range where each of the narrow band component signals has been formed by obtaining the product of the wide band signal and a continuous multiplier signal variable between values of +1 and −1 at a fraquency related to the particular frequency range and in a particular phase displacement relative to the multiplier signals for the other component signals, said multiplexer including the combination of:

a plurality of separate channels each connected to receive only an indivdual one of the component signals in the plurality, a plurality of separate multipliers each being associated with an individual one of the channels for receiving the respective component signal in the channel, each of the multipliers being effective to alternatively multiply the associated component signal by +1 and −1 in accordance with the variations in the multiplier signal, control means for generating a plurality of continuous multiplier signals each variable between the values of +1 and −1 at the frequency related to the particular frequency range and in the particular phase displacement relative to the multiplier signals for the other component signals, a plurality of multiplier means interconnecting the control means with the different channels in the plurality for causing each of the multipliers to alternately multiply the associated component signal by +1 and −1 in accordance with variations in the associated multiplier signal, and means for combining the signals from the multiplier means in the plurality to obtain the wide band signal.

21. A frequency division multiplexer for combining a plurality of narrow band component signals to form a broad band signal having a particular frequency range where each of the narrow band component signals has been formed by obtaining the product of the wide band signal and a continuous squarewave signal variable between values of +1 and −1 at a frequency related to the particular frequency range and in a particular phase displacement relative to the squarewave signals for the other component signals, said multiplexer including the combination of:

a plurality of separate channels each being connected to receive an individual one of the component signals, a plurality of separate multipliers each connected in an individual one of the channels for receiving the associated component signal, squarewave generator means having a plurality of separate outputs for the different multipliers in the plurality, said generator being constructed to generate a plurality of continuous squarewave signals each variable between values of +1 and −1 at the frequency related to the particular frequency range and in the particular phase displacement relative to the squarewave signals for the other components signals, a plurality of control inputs each interconnected between an individual one of the multipliers in the plurality and an individual one of the outputs from the generator, each of the inputs being constructed to receive an individual one of the squarewaves and actuate its respective multiplier to multiply its respective component signal at the same frequency and phase as the squarewave to provide a resultant signal in accordance with the characteristics of the component signal and the variations of the squarewave between the variations of +1 and −1, and means interconnected with said multipliers to combine said resultant signals to form the wide band signal.

22. In a frequency division multiplexer for combining a plurality of component signals having narrow bandwidths in a wide band signal having a praticular frequency range where each of the narrow band component signals has been formed by obtaining the product of the wide band signal and a continuous multiplier signal variable between values of +1 and −1 at a frequency related to the particular frequency range and in a particular phase displacement relative to the multiplier signals for the other component signals and were one of the narrow band signals has been formed directly from the wide band signal and where all of the narrow band signals have been passed through low pass filters constructed to pass signals in a frequency range related to the particular frequency range of the wide band signal.

a plurality of separate inputs for individual ones of the component signals, a first channel interconnected with a first input in the plurality for receiving a first component signal in the plurality to continuously pass the first component signal to provide a resultant signal, a pair of channels interconnected with an individual pair of inputs in the plurality for receiving an individual pair of the component signals in the plurality, a multiplier in each of the channels in the pair, control means for generating for each multiplier an individual multiplier signal variable between the values of +1 and −1 at the frequency related to the particular frequency range and in the particular phase displacement relative to the multiplier signals for the other component signals, means interconnecting the control means with the multipliers for transferring said pair of multiplier signals to the multipliers, each of the multipliers being constructed to vary the associated component signal in accordance with the variations between the values of +1 and −1 in the associated multiplier signal to provide a resultant signal, and means interconnected with the channels for adding the pair of resultant signals and the first component signal to provide for the production of the wide band signal.

23. A frequency division multiplexer for combining four separate component signals having bandwidths in a wide band signal having a particular frequency range where each of the narrow band component signals has been formed by obtaining the product of the wide band signal and a continuous multiplier signal variable between values of +1 and −1 at a frequency related to the particular frequency range and in a particular phase displacement relative to the multiplier signals for the other component signals and where a pair of the multiplier signals have a frequency one-half that of a third one of the multiplier signals and have substantially 180° phase relationship to each other and where all of the component signals have been passed through low pass filters constructed to pass signals in a frequency range related to the particular frequency range of the wide band signal, said multiplexer including the combination of:

a plurality of separate inputs each connected to receive an individual one of the component signals, a first channel interconnected with a first input in the plurality of passing a first one of the component signals in the plurality, a pair of channels interconnected with second and third of the inputs in the plurality of passing second and third of the inputs in the plurality for passing second and third of the component signals in the plurality, a squarewave generator for generating a plurality of squarewaves variable between values of +1 and −1 and including a pair of squarewaves having a frequency one-half that of a third squarewave and having a substantially 180° phase relationship to each other, a plurality of multipliers each connected to receive an individual one of the squarewaves and an individual one of the component signals and to combine the introduced signals to produce a resultant signal having characteristics dependent upon the characteristics of the component signal and the squarewave signal, and means interconnected with the multipliers in the plurality and the first channel for combining the resultant signals from the multipliers and the signal from the first channel to produce the wide band signal.

24. A recorder dividing an original wide band signal into a plurality of narrow band component signals and recording the narrow band signals, said recorder including the combination of:

an input for receiving the original wide band signal, a plurality of multipliers interconnected with the input for receiving the wide band signals, control means for continuously generating a plurality of control signals for the different multipliers and for providing for each of the control signals amplitude characteristics variable between values of +1 and −1 at a particular frequency and in a particular phase relative to the other control signals, a plurality of control inputs each interconnected with an individual one of the multipliers in the plurality, each of the control inputs being interconnected with said control means for receiving an individual one of the control signals and causing the multipliers to multiply the original wide band signal in accordance with the amplitude characteristics of the individual control signal to provide a plurality of resultant signals, a plurality of separate filter means each interconnected with the multipliers for filtering the resultant signals from the multipliers, each of said filters having a pass band that is the same as said narrow band to pass only the component signals, and a plurality of separate recording heads each interconnected with an individual one of the filters and each spaced from the other recording heads in the plurality for recording the component signals.

References Cited

UNITED STATES PATENTS

| | | | |
|---|---|---|---|
| 2,892,886 | 6/1959 | Johnson | 178—6.6 |
| 2,944,113 | 7/1959 | Wehde | 179—100.2 |
| 3,015,689 | 1/1962 | Hirsch | 178—5.4 |
| 3,109,070 | 10/1963 | David | 179—15.55 |

BERNARD KONICK, *Primary Examiner.*

L. J. SCHROEDER, *Assistant Examiner.*